US006754659B2

(12) United States Patent
Sarkar et al.

(10) Patent No.: US 6,754,659 B2
(45) Date of Patent: Jun. 22, 2004

(54) METHOD FOR RUNNING EXISTING JAVA BEANS IN AN ENTERPRISE JAVA BEAN ENVIRONMENT

(75) Inventors: Soumitra Sarkar, Cary, NC (US); Daniel J. Labrecque, Chapel Hill, NC (US); Steven W. Pogue, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 09/828,755

(22) Filed: Apr. 9, 2001

(65) Prior Publication Data

US 2004/0015839 A1 Jan. 22, 2004

(51) Int. Cl.$^7$ .............................................. G06F 17/30
(52) U.S. Cl. ...................................... 707/10; 707/104.1
(58) Field of Search .......................... 707/2, 10, 104.1; 709/203, 202; 715/507; 717/170, 107; 719/318, 328

(56) References Cited

U.S. PATENT DOCUMENTS

| 6,016,489 A | * | 1/2000 | Cavanaugh et al. | ............ | 707/8 |
| 6,125,383 A | * | 9/2000 | Glynias et al. | ............. | 709/202 |
| 6,453,333 B1 | * | 9/2002 | Glynias et al. | ............. | 709/202 |

OTHER PUBLICATIONS

BEA WebLogic Server 5.1 documentation, copyright 2000, pp. 1–30.*
A. Tost and V.M. Johnson, Using JavaBeans components as accessors to Enterprise JavaBeans components, 2000, IBM Systems Journal, vol. 39.*
Moon–Soo Lee et al., The Design And Implementation Of Enterprise JavaBean(EJB) Wrapper For Legacy System, 2001 IEEE.*
Jason Brazile et al., A generated XML Interface to An Abstract Marketdata Service, 1998, pp. 1–11.*

* cited by examiner

*Primary Examiner*—Diane D. Mizrahi
*Assistant Examiner*—Apu Mofiz
(74) *Attorney, Agent, or Firm*—Synnestvedt & Lechner LLP; Jerry W. Herndon

(57) ABSTRACT

A method and system for running application code originally developed as simple Java Beans, in an Enterprise Java Bean (EJB) environment, without modifying the original application code is described. This is accomplished by running one or more original Java beans in an EJB environment based on control from an external program, using at least the steps of defining a single generic EJB and installing the single generic EJB in an EJB container; generating EJB support code for each of the one or more original Java beans, and executing the EJB support code to drive the generic EJB to perform the functions of the one or more original Java beans in an EJB environment.

9 Claims, 10 Drawing Sheets

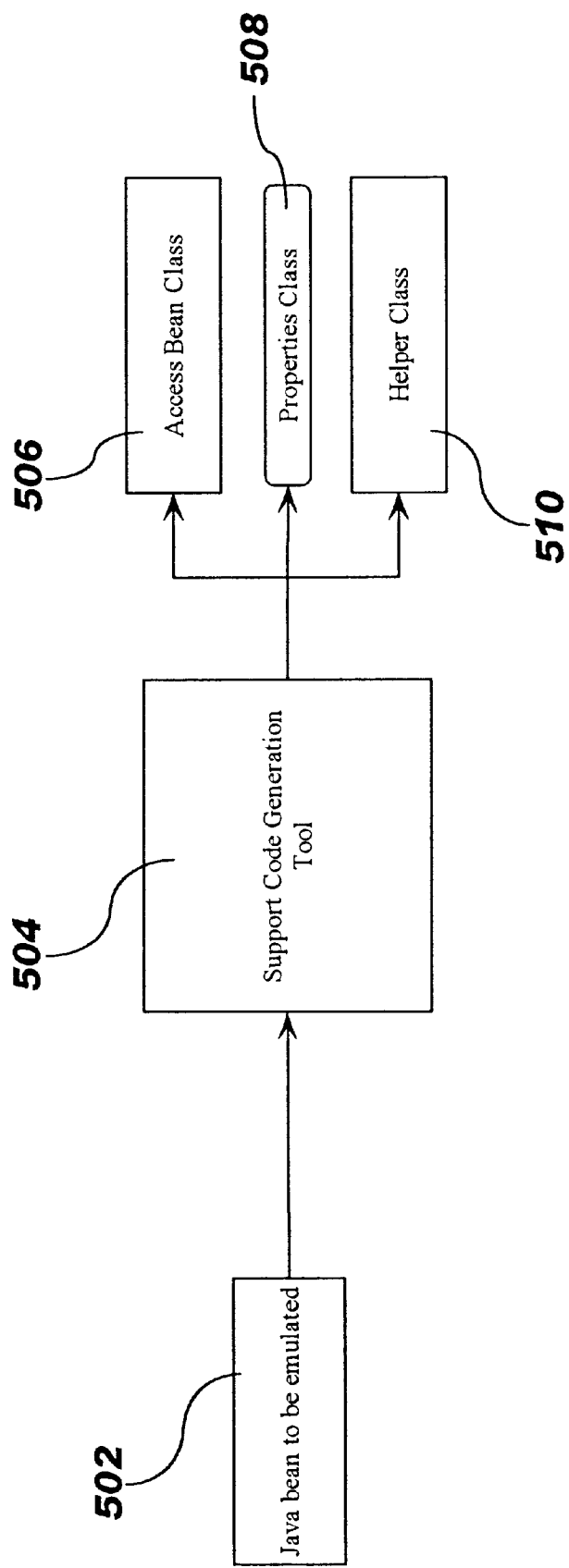

METHOD FOR RUNNING EXISTING JAVA BEANS IN AN ENTERPRISE JAVA BEAN ENVIRONMENT

BACKGROUND OF THE INVENTION

1. Field of the Invention

The present invention relates to the field of object-oriented programming for building component-based distributed business applications using the Enterprise Java-Beans™ architecture and, more particularly, to a method and system for running application code originally developed as simple Java beans, in an Enterprise JavaBean (EJB) environment, without modifying the original application code.

2. Description of the Related Art

The Java programming system is an object-oriented system utilizing the Java programming language and is particularly valuable for use in a distributed environment such as the Internet. The convergence of the electronic entertainment and consumer industries with data processing exponentially accelerated the demand for wide ranging communications distribution channels, and the explosion of the World Wide Web propelled the Java system and language to the forefront of computer technology. For details and background with respect to the Java system, reference may be made to a typical text, "Just Java", Second Edition, Peter van der Linden, Sun Microsystems, 1997. Throughout the 1990s, thousands of programs were written to exploit the abilities of the Java system and language. A specific example of one such program is the IBM product called "Host Publisher", discussed in more detail below.

The Java programming system involves the definition, creation, and use of "objects". These objects are software entities, comprising data elements (called "properties" or "attributes"), and "methods" which manipulate the data elements. The Java programming language can be used to create complete applications that can be run on a single computer or be distributed among servers and clients in a network.

The JavaBeans™ API (Application Programmer's Interface) is a widely used API in Java programming. A Java bean is a basic Java object which adheres to certain naming conventions for its methods and properties; namely, Java beans have properties (i.e., data fields) and provide access to those properties via "setter" and "getter" methods. Generically known as "accessors", setters modify the value of a data field and getters obtain the value of a field from a location identified in the bean. Java beans and their common properties and functions are described in detail in the text, "Java in a Nut Shell," 2nd. Edition by David Flanagan, published by O'Reilly and Assoc. Inc., California, 1997, particularly Chapter 10, pp. 178–189.

The goal of the Java bean model is its commonality and interoperability with other beans to form a combination component or bean, and the Java bean, like Java itself, was widely accepted in the industry and was (and is) utilized to develop and enhance thousands of computer programs. Beans have defined common interfaces and thus, when beans are connectable via their common interfaces, the interfacing beans may export to each other 1) properties or attributes, 2) events and 3) methods.

IBM's "Host Publisher" is an example of a program that was developed based on the Java bean model. It is a solution, specifically designed for building Web applications, that extracts information from "legacy" terminal-oriented applications based on 3270, 5250, and VT data streams, as well as relational databases. A legacy application is an application based on languages, platforms, and/or techniques earlier than the currently-available technology. Legacy applications present a significant challenge to enterprises, in that the legacy applications often perform operations critical to the enterprise and must be kept running while being converted to the current technology.

For terminal-oriented applications, Host Publisher provides tools for building Java beans that can extract information from those applications without modifying the applications themselves. Using Host Publisher, a legacy application, e.g., one based on a 3270 data stream, can be navigated through its various screens by a Host Publisher Java bean known as an "Integration Object" or "IO".

FIG. 1 illustrates a typical Java bean environment according to the prior art. A client Java application/JSP 100 (a Java Server Pages (JSP) page is an example of a client Java application) creates instances of Java beans JB101, JB102, JB103 . . . , Jbn. The client Java application/JSP 100 invokes the setter methods of Java bean JB101 to provide the "input property" values. Input properties could be, for example, the last and first name of a person whose directory information is being accessed by running a Host Application 130. Next, the client Java application/JSP 100 invokes the "execution methods" of the Java bean JB101 to direct it to perform the required functions with regard to the Host Application 130. An execution method is typically an instruction or instruction set that directs the Java bean to run a "macro" that would run the Host Application 130. This execution of the Host Application 130 causes data to be retrieved from a legacy data source or program and presented on a screen, which data is then extracted and placed in the output properties of the Java bean. In the context of the example discussed above, the output data could be specific information from the directory of the person identified by the input properties; this information is called "output properties." Processing control is then returned to the Client Java application/JSP 100, which invokes the getter methods of the Java bean JB101 to retrieve the data in the output properties.

The information from various screens is extracted in this manner and can be can be used to generate a Web page dynamically. The Web page can then be presented to a browser user who is not familiar with the 3270 application's user interface. This enables legacy application rejuvenation, and allows the investment in the existing application to be exploited for competitive advantage. Host Publisher has been an extremely useful and successful product and is utilized by many for building dynamic Web pages based on legacy applications.

In connection with Sun Microsystems' delivery of the Java2 Enterprise Edition (J2EE) platform in December of 1999, a technology known as EJB (Enterprise Java Bean) technology was developed, and EJB support is the cornerstone of the J2EE platform. Despite its name, an EJB is not a Java bean; it is an industry standard architecture for running server-side business logic, providing additional benefits of locatability in a network, and scalability. Among other improvements, EJB technology reduces time to market for enterprise-class applications. J2EE and EJB's have received widespread industry support and growing customer acceptance and increased investment focus has been placed on EJB and J2EE technology by the industry. A problem exists, however, since many products, such as Host Publisher, are based on Java bean technology and will not readily function with EJB technology.

One method of enabling a Java bean (such as a Host Publisher IO) to run in an EJB environment involves a very cumbersome process of rewriting and compiling each Java bean to follow EJB coding conventions and use supporting APIs, i.e., creating a custom EJB that performs the same functions as the Java bean, and repeating this step for each Java bean. For example, when attempting to utilize a Host Publisher IO to screen-scrape a program operating in an EJB environment, the IO, which as mentioned above, is a Host Publisher-specific Java bean, cannot run in an EJB environment. FIG. 2 is a block diagram illustrating this rewriting and compiling process. Referring to FIG. 2, a series of Java Beans JB201, JB202, JB203 . . . , JB2n are shown. Since these Java beans will not function in an EJB environment, the code of each Java bean JB201, JB202, JB203, . . . , JB2n is rewritten following EJB coding conventions and recompiled using the standard Java compiler. This can be accomplished by a Java programmer using standard Java tools. Thus, JB201 is rewritten and compiled as EJB 216; JB202 is rewritten and compiled as EJB 217; JB203 is rewritten and compiled as EJB 218; . . . , and JB2n is rewritten and compiled as EJB 2n.

FIG. 3 illustrates the operation of the rewritten and compiled Java beans, now EJB's, in an EJB environment. As shown in FIG. 3, once the rewriting/compiling process is complete for each Java Bean, the respective EJB's can be deployed in an EJB container 315 of an EJB server 310 in a known manner. The EJB's are then available for use as needed to perform the same functions on a Host Application 330 as those of the Java beans.

While the above-described rewriting/compiling process works adequately, it is time consuming. Further, typical EJB containers can only hold a relatively small number of EJB's and still remain effective. As the number of unique EJBs in the container increases, the amount of processing required to run any one EJB can increase exponentially, thereby degrading performance and scalability.

Another method of enabling a Java bean to run in an EJB environment is to, rather than rewriting and compiling the Java bean as an EJB, instead, write a new EJB for each Java bean which will, during operation, create an instance of the original, unmodified Java bean and drive the getters and setters and execution methods of the newly-created Java bean instance. While this has the advantage of not having to change the original Java bean (since it is used "as is" by the EJB), this is still a time-consuming process and has the same disadvantage of producing a potentially large number of unique EJBs, one per unique Java bean, which would not run efficiently in typical EJB containers.

In both of the above methods of creating unique EJBs, one per unique Java bean, the method revolves around creating an EJB that provides the same properties and Java execution methods as the original Java bean. That is to say, EJB X would have the same getter/setter and execution methods as Java bean X whose functionality it is to perform.

While the above-described methods work adequately, they may not work well for an EJB environment. In particular, for those Java beans which contain a large number of input and/or output properties, requiring a separate invocation of the EJB's setter method for each input property value and/or getter method for each output property value would be inefficient and excessively network-intensive, given the apparent client/server nature of the EJB architecture.

In both the above methods of creating unique EJBs, one per original Java bean, there is a further requirement to change the client Java application or the JSP to invoke the unique EJB instead of the original Java bean. In addition to being time-consuming and cumbersome, the skill required to change the client code to invoke the EJB is specialized and may not be readily available.

Accordingly, a need exists for a method for easily and efficiently enabling a client Java application, which uses the functions provided by a Java bean, to perform the same functions in an Enterprise JavaBeans environment, thus reaping the benefits of EJB technology.

SUMMARY OF THE INVENTION

The present invention provides a method for enabling the operation of object-oriented programs based on Java bean technology in an EJB environment. It is a method and system for running application code originally developed as simple Java beans, in an Enterprise Java Bean (EJB) environment, without modifying the original application code. This is accomplished by running one or more original Java beans in an EJB environment based on control from an external program, using at least the steps of defining a single generic EJB and installing the single generic EJB in an EJB container; generating EJB support code for each of the one or more original Java beans, and executing the EJB support code to drive the generic EJB to perform the functions of the one or more original Java beans in the EJB environment In a preferred embodiment, the step of generating EJB support code comprises at least the steps of: introspecting each of the one or more original Java beans to determine their setter/getter and execution methods; generating, for each of the one or more original Java beans, an access bean class having the same signature (the same input and output properties and execution methods) as the original Java bean class; generating, for each of the one or more original Java beans, a properties class containing input and output properties matching those of the original Java bean class, and thus, the access bean class; generating, for each of the one or more Java beans, a helper class that subclassess the original Java bean; and setting a static variable in each of the properties classes to correlate it with its associated helper class.

In a more preferred embodiment, the external program is modified so that for each of the original Java beans it was using, it drives the access bean instead of the original Java bean, and the execution step comprises at least the steps of: creating an access bean object (an instance of a class) and a properties object for the original Java bean; setting the input properties of the properties object; and invoking the execution method of the access bean; creating an instance of the generic EJB, calling the generic EJB's business method, and passing to it the properties object containing the input property values of the access bean which corresponds to the input property values of the original Java bean; the generic EJB creates the helper object corresponding to the original Java bean using Java reflection; passing to the helper object the properties object passed to the generic EJB's business method; and calling the main execution method of the helper object; the helper object executing the original Java bean which is an instance of its parent class by using the original Java bean's input properties from the corresponding properties object that was passed to it by the generic EJB; the helper object creating a second properties object after the Java bean execution is complete, the second properties object containing the original Java bean's output properties; passing the second properties object back to the generic EJB when the main execution method of the helper object completes; passing the second properties object from the generic EJB, to the corresponding access bean object when the EJB business method execution completes; and saving the second properties object and returning control to the external program.

BRIEF DESCRIPTION OF THE DRAWINGS

FIG. 5 is a block diagram of the generation phase illustrated by the flowchart of FIG. 4;

DETAILED DESCRIPTION OF THE PREFERRED EMBODIMENTS

In accordance with the present invention, "generic EJB" is defined to interact with automatically-generated EJB support code to enable one or more "original" Java beans (Java beans otherwise unable to function in an EJB environment) to operate in an EJB environment. The present invention involves an installation phase, during which a single generic EJB is installed (copied) on the system where the EJB execution has already been installed, a generation phase, during which EJB support code is generated based on analysis of the original Java bean class, and an execution phase, during which the execution steps of the original Java beans are performed in the EJB environment.

Figure 1:
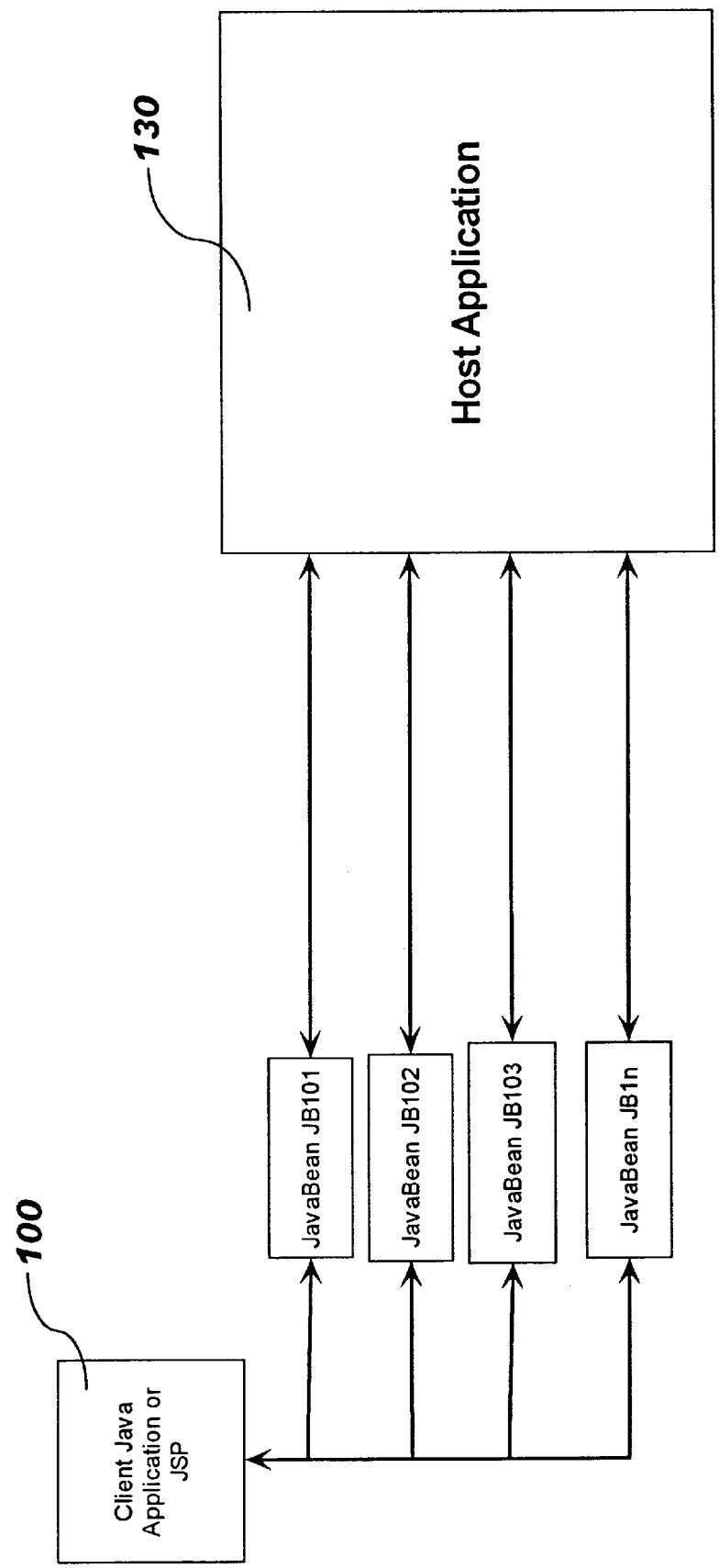
FIG. 1 illustrates a typical Java bean environment according to the prior art.
Figure 2:
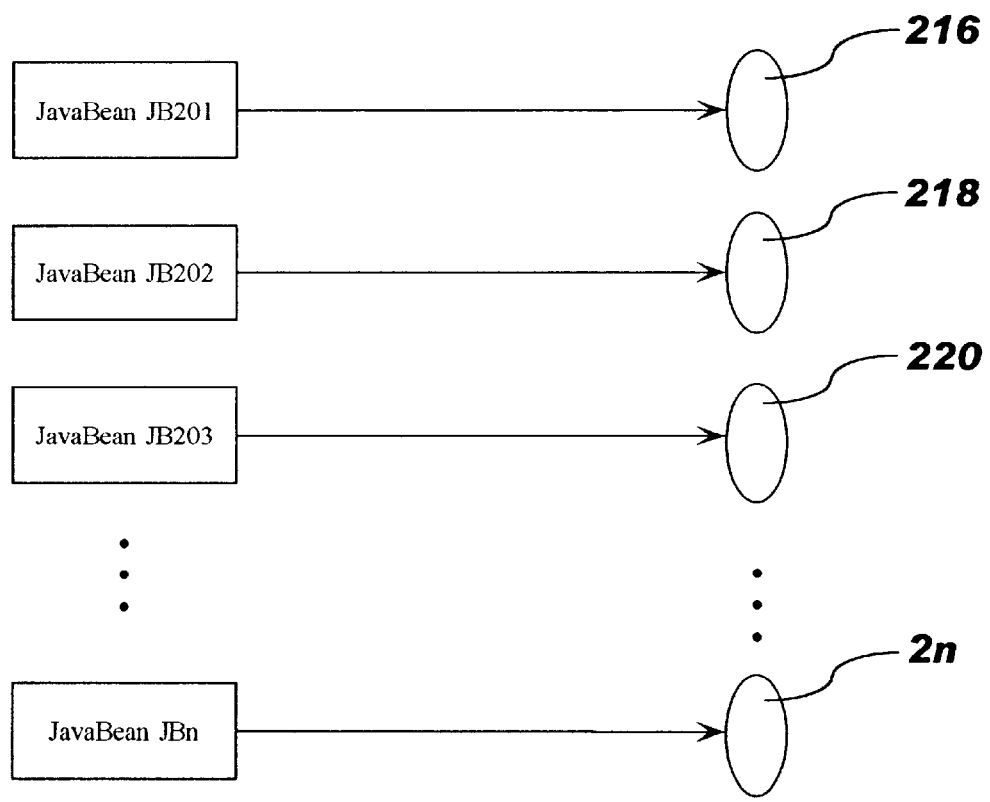
FIG. 2 is a block diagram illustrating the rewriting and compiling process with respect to Java beans, to enable them to be run in an EJB environment.
Figure 3:
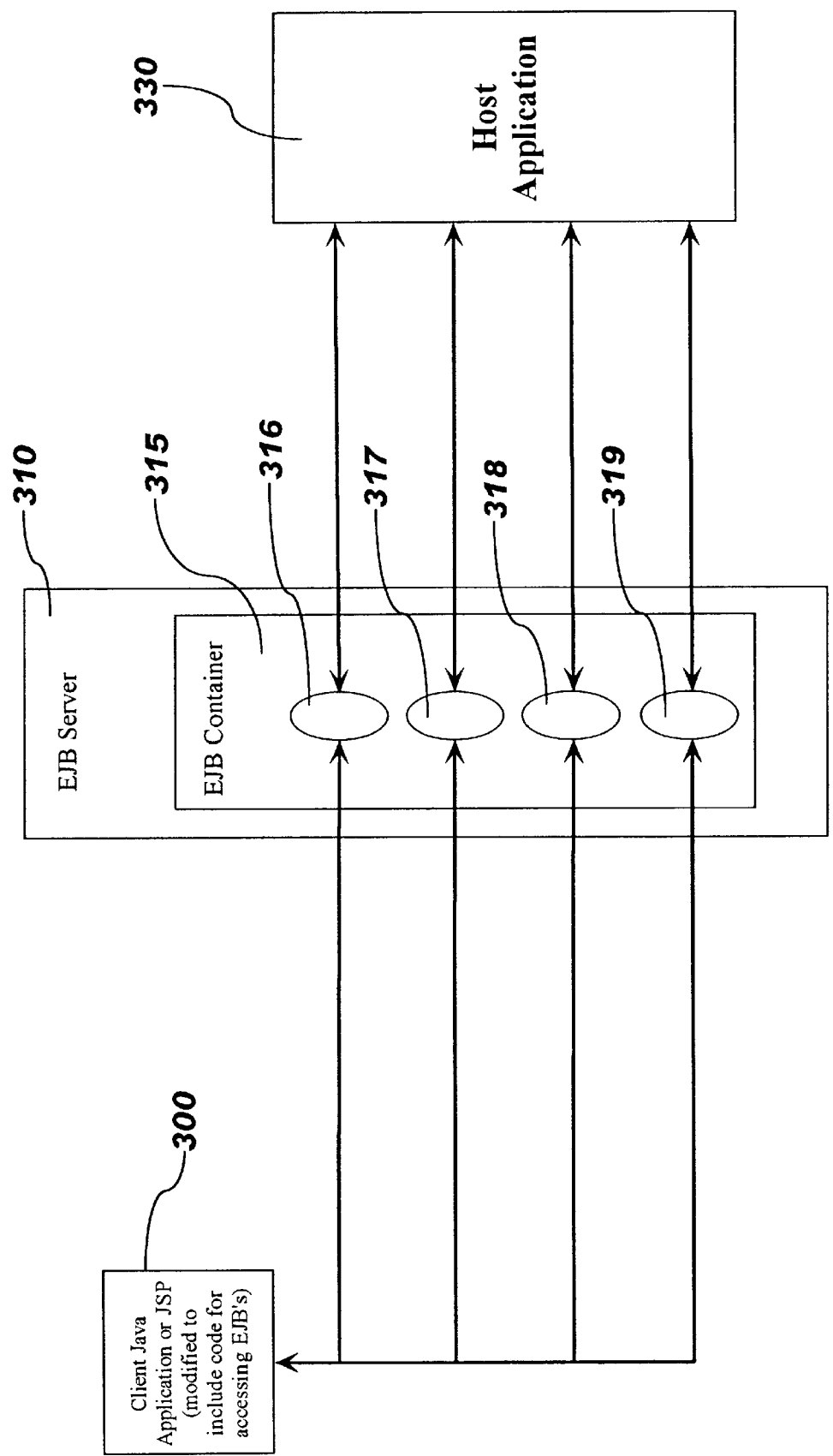
FIG. 3 illustrates the operation of a Java bean rewritten and compiled in accordance with FIG. 2.
Figure 4:
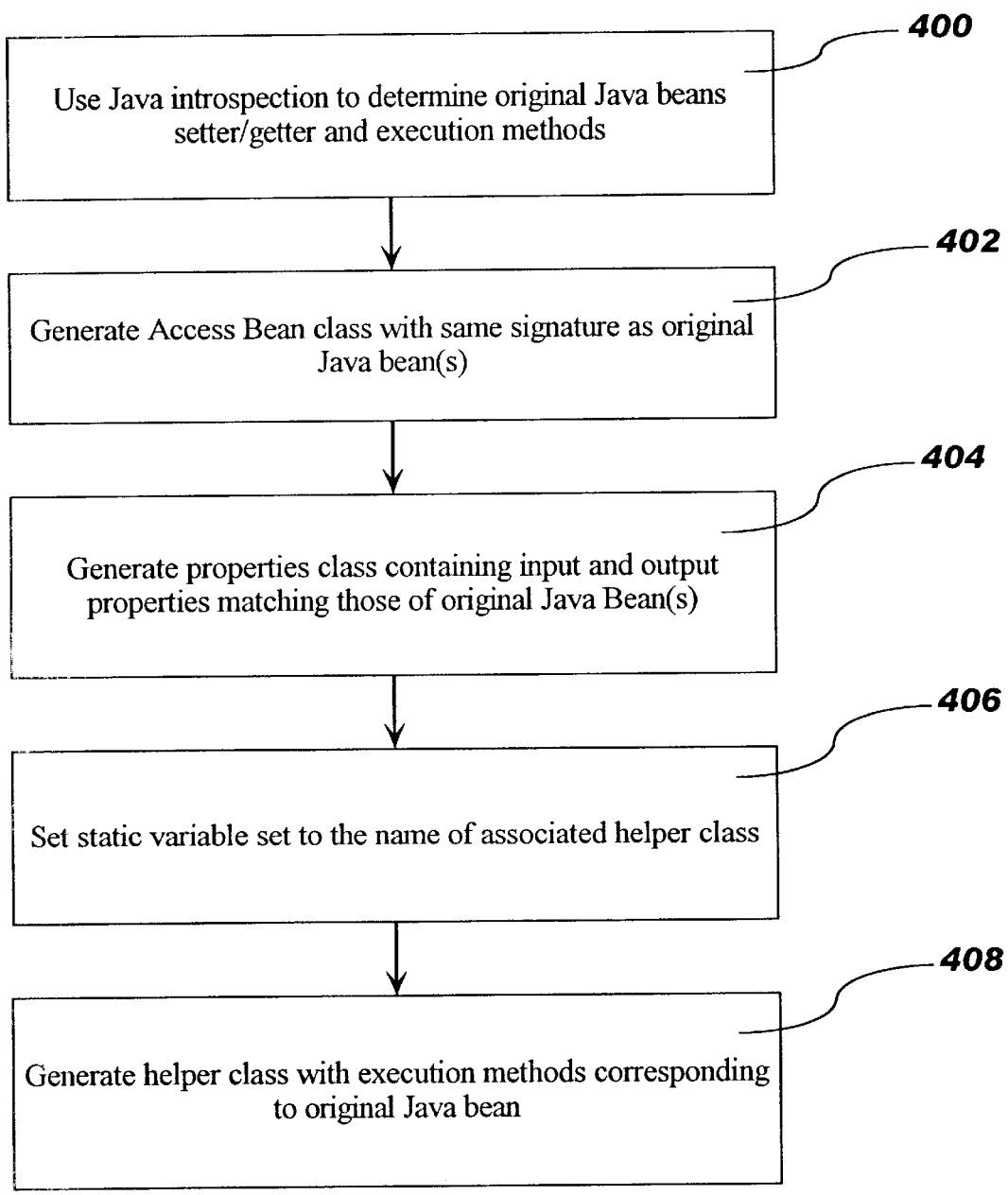
FIG. 4 is a flowchart illustrating an example of steps to be followed during a generation phase in accordance with the present invention.
Figure 6A:
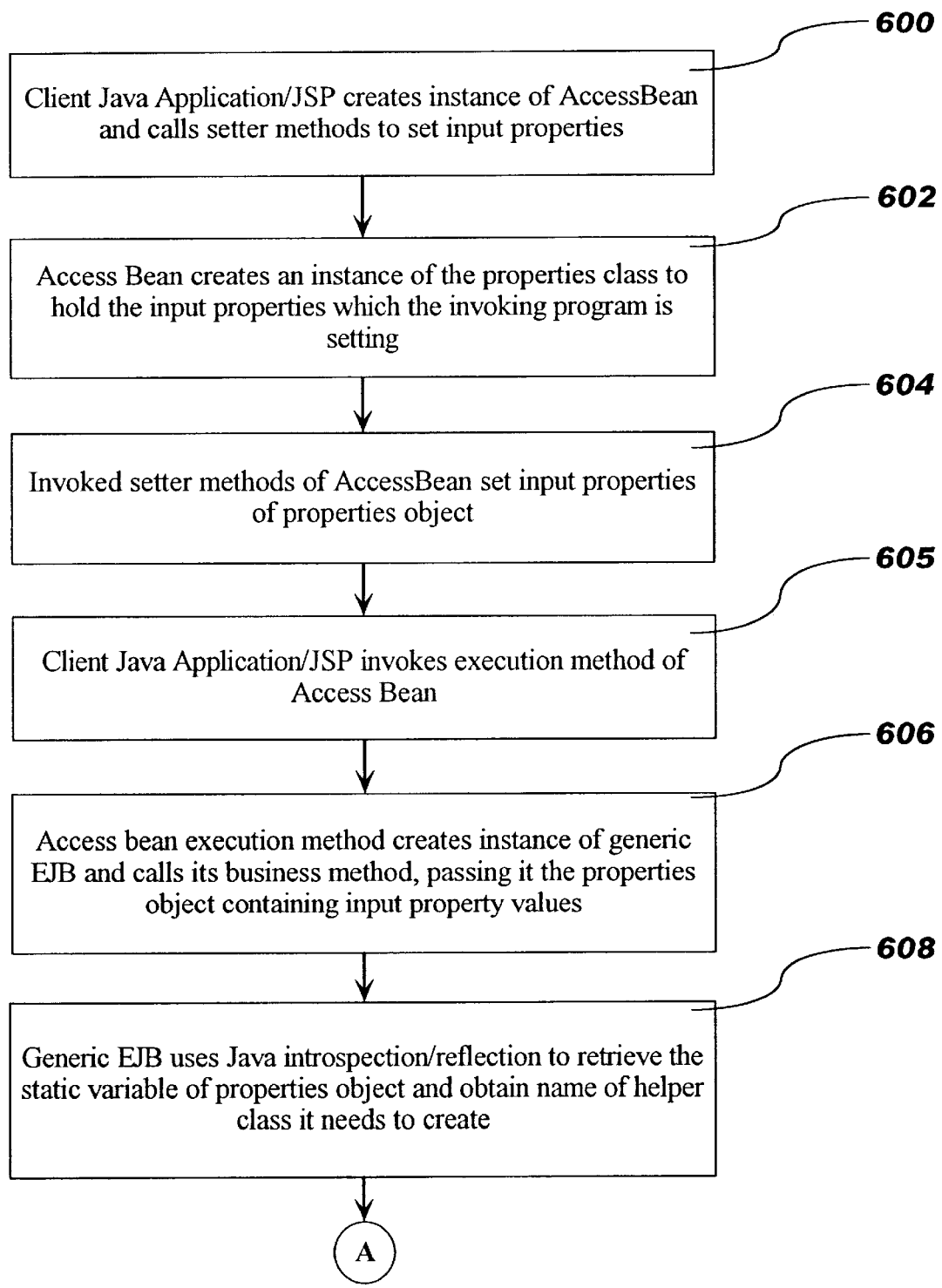
FIGS. 6A–6D is a flowchart illustrating an example of steps to be followed to execute the functions of Java beans in an EJB environment, in accordance with the present invention.
Figure 6B:
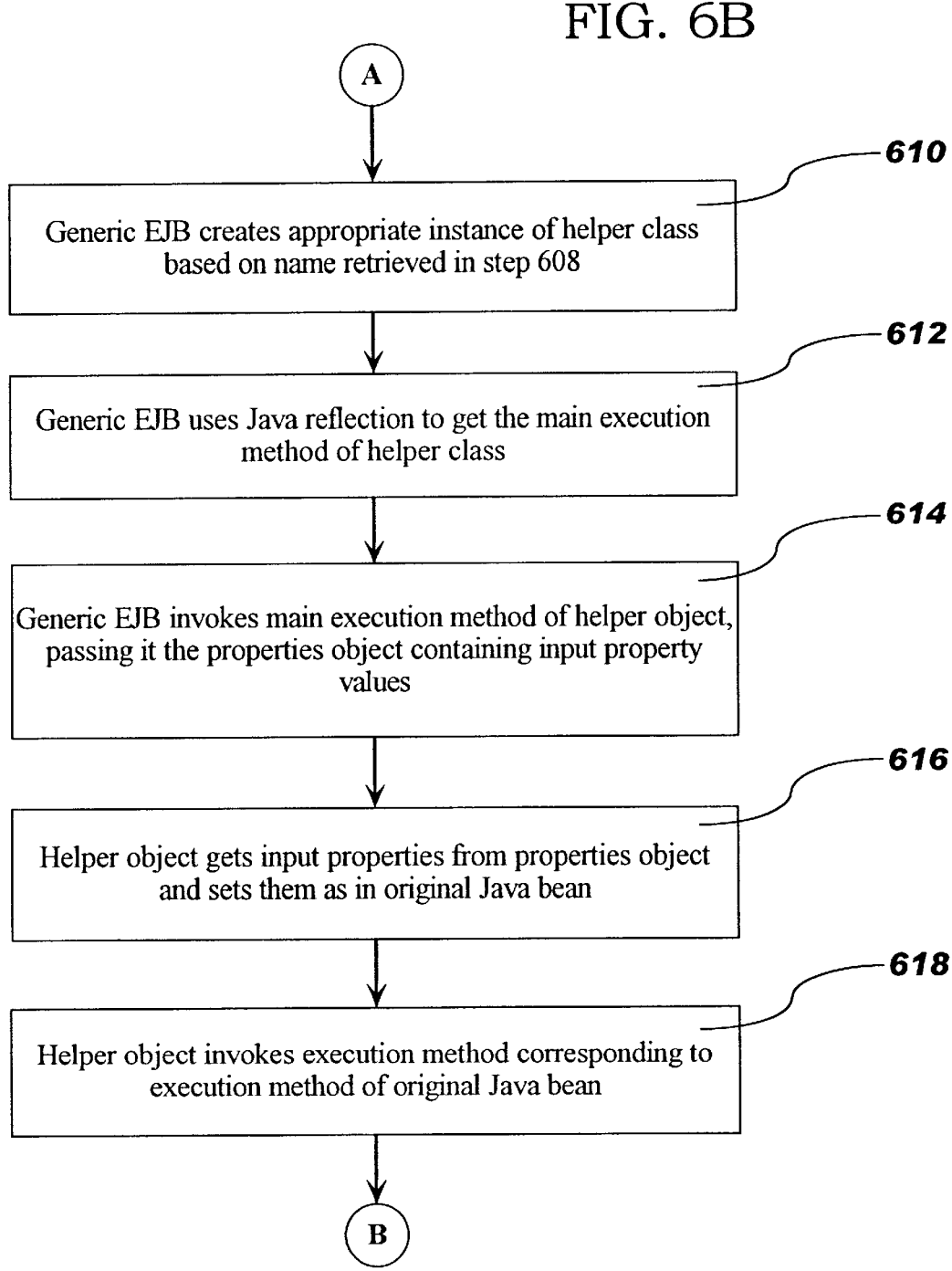
Figure 6C:
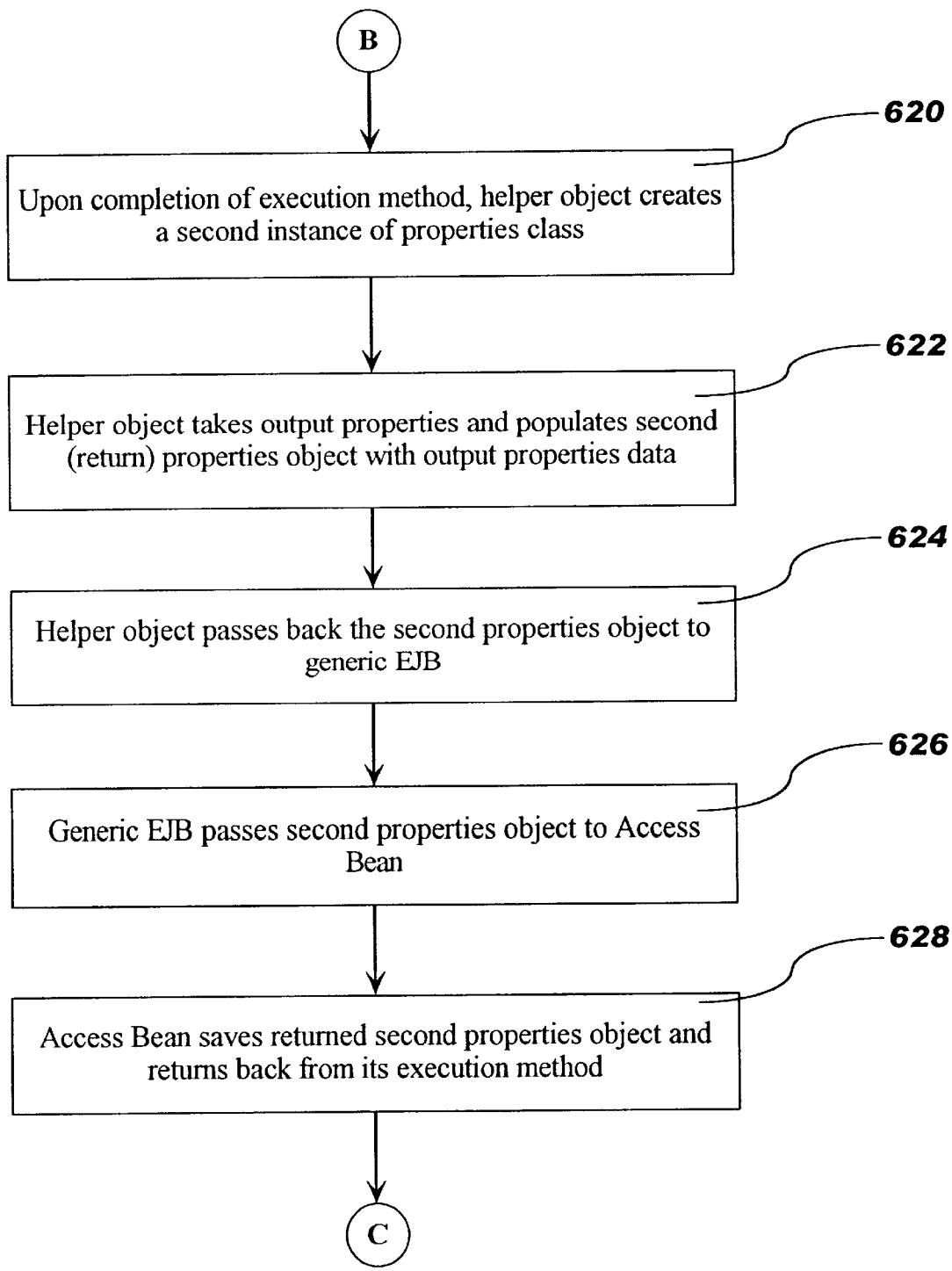
Figure 6D:
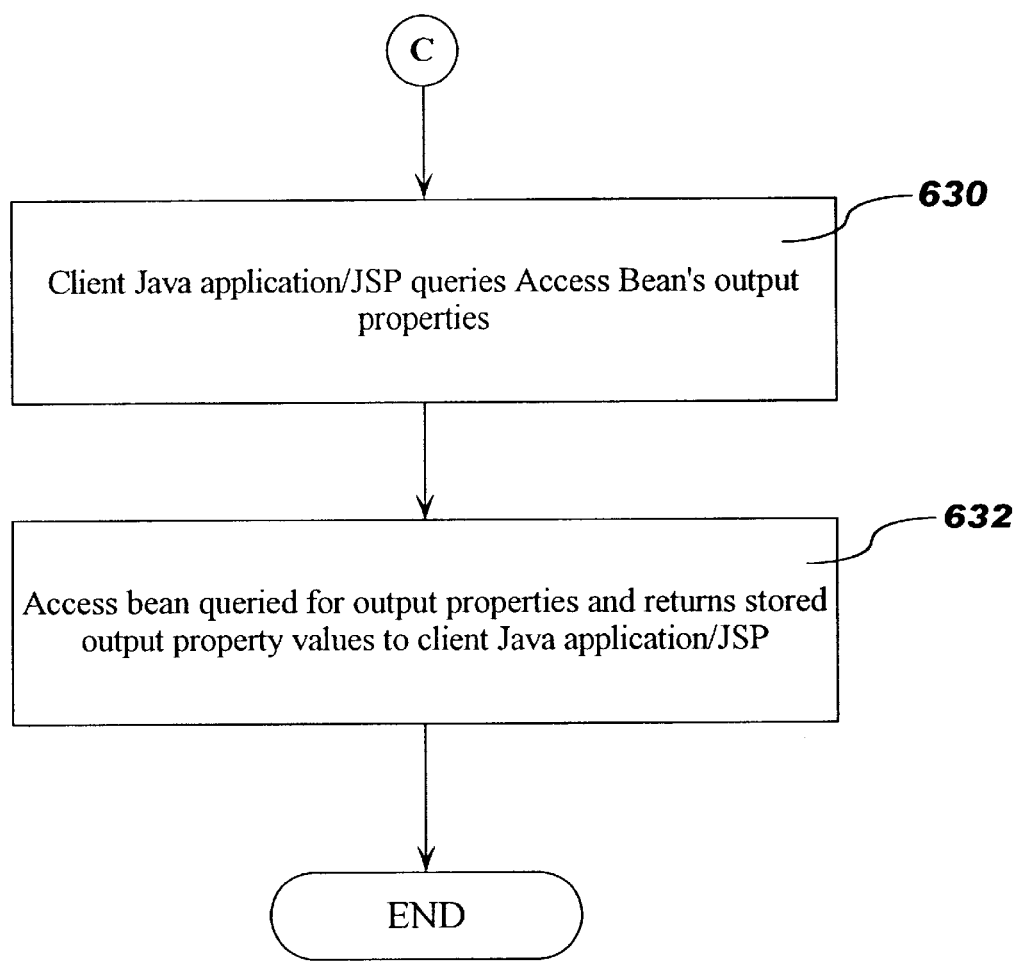

FIG. 4 is a flowchart illustrating an example of steps followed during the generation phase to define and generate EJB support files corresponding to a Java bean, and FIG. 5 illustrates the steps pertaining to generation of the EJB support files pictorially.

The generic EJB is defined once by a Java programmer and the corresponding Java class file is installed on the machine where the EJB execution environment has been configured. To create the generic EJB, the programmer uses known Java and EJB programming techniques so that it can interact specifically with all of the Java bean support code (discussed below) generated for an existing Java bean to run the Java bean function in an EJB environment. The generic EJB does not have any Java bean-specific code (hence the term "generic"), but is designed so that using the Java bean-specific support code, it can run the original Java bean in an EJB environment. To create the code for the generic EJB, all the programmer needs to know are the classes of the support code to be generated (in this example, described in more detail below, the classes are an "Access Bean class," the "properties class," and the "helper class"); the programmer can then define the generic EJB to perform reflection on these classes in a known manner. This single generic EJB is then deployed in an EJB container in a known manner, where it is available to run the original Java beans in an EJB environment.

Referring now to FIGS. 4–5, at step 400, a support code generation tool 504, utilizing Java's introspection capability determines the setter/getter methods and execution methods of original Java bean 502 to be emulated. Then, utilizing these determined methods, Access Bean class 506 is generated (step 402), having the same signature (i.e., the same getter/setter/execution methods) as original Java bean 502. In addition, Access Bean class 506 also must contain client code enabling it to "communicate" with a generic EJB, as discussed in more detail below.

Based also on the signature of original Java bean 502, a properties class 508 is generated (step 404) which is configured to contain input and output properties matching those of original Java bean 502. The properties class 508 also has a static variable set to the name of an associated helper class 510 (step 406) so that they will be correlated to each other during the execution phase, described below.

Finally, based on the input and output properties in the original Java bean 502, helper class 510 is generated (step 408). Helper class 510 is a Java subclass of original Java bean 502 and thus is configured to contain the same setter, getter and execution methods of the original Java bean 502 and also will contain additional code to efficiently set the input properties of the original Java bean, using the properties object, without using Java introspection at execution time, when invoked from the generic EJB. The same process (generation of the support code) is repeated for each original Java bean that is to be executed in the EJB environment. This completes the generation phase.

Figure 7:
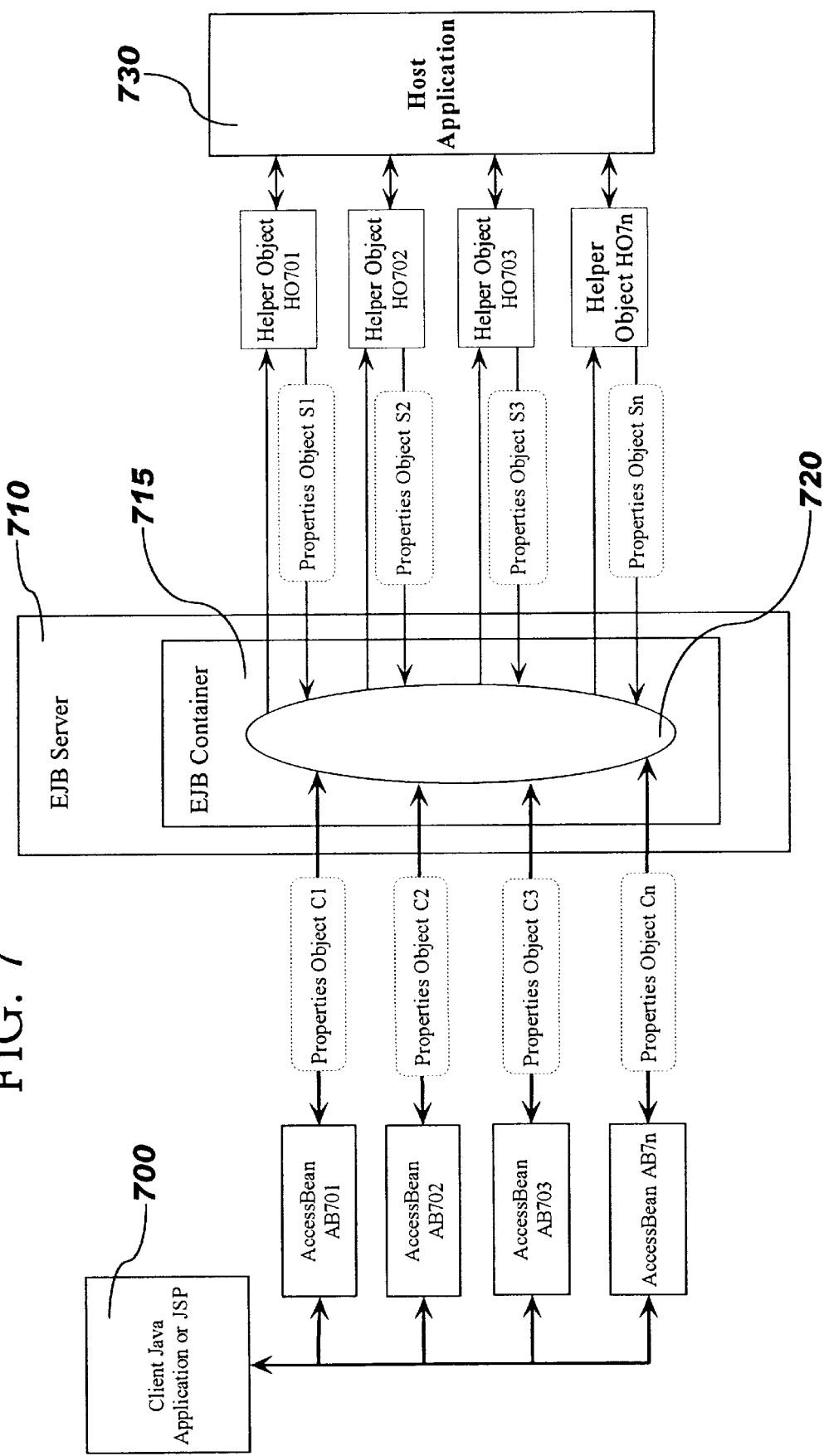
FIG. 7 is a block diagram of the execution functions illustrated by the flowchart of FIGS. 6A–6D.

FIGS. 6A–6D comprise a flowchart illustrating an example of steps followed to execute the Java beans in the EJB environment, and FIG. 7 illustrates these steps pictorially. Referring to FIGS. 6A–6D and 7, at execution time, the invoking client Java application or JSP 700 creates an instance of an Access Bean class, e.g. Access Bean object AB 701, and sets its input properties (steps 600–605).

Specifically, the invoking client Java application/JSP 700 calls the Access Bean class's setter methods to set the bean's input properties (step 600). At step 602, the access bean creates an instance of the properties class (508 in FIG. 5) to hold the input properties which the invoking program is setting. At step 604 the invoked setter methods of Access Bean AB701 set the input properties of the properties object C1. The properties object C1 also has a static variable set to the name of an associated helper class (510 in FIG. 5) so that they are correlated to each other. At step 605, the client Java application/JSP 700 calls the execution method of the Access Bean object AB701.

Then, at step 606, the Access Bean object AB701 retrieves environment information about generic EJB 720, locates it, and creates an instance of the generic EJB 720 using standard EJB API calls. Creating an instance of the generic EJB 720 causes the EJB container 715 to allocate system memory to hold or store that instance. Then, the Access bean's execution method invokes the main business method of the generic EJB 720 using the properties class as argument.

Next, in steps 608–614, a helper object is created by the business method of the generic EJB, using reflection to decide which helper class to instantiate, and the helper object's execution method is invoked by the EJB's business method, passing it the properties. The properties object has the input properties of the original access bean, and these are thus passed to the helper object as well. Finally, the main execution method of the helper class is called. Specifically, at step 608, the generic EJB 720 uses Java class/ introspection/reflection to retrieve the static variable of properties object C1 and obtain the name of the helper object it needs to instantiate which is based on the previously-set static variable. Then, at step 610, the generic EJB 720 creates the appropriate instance of the helper object (in this example, HO701) based upon the name retrieved in step 608.

At step 612, the generic EJB 720 uses Java reflection to get the main execution method of the helper object HO701 and, at step 614, invokes it, passing in the properties object C1 as an argument. The helper object uses the passed-in properties object C1 to set the input properties of the Java bean of which it is a Java subclass, without using Java reflection to achieve this efficiently, and then invokes the execution method of the Java bean (an instance of its superclass) using standard Java techniques. This causes the processes that are identified by the Java bean, from which Access Bean AB701 and helper object HO701 were derived, to be executed. The difference is that this execution occurs in an EJB environment, thereby providing the benefits of locatability and scalability that the generic EJB provides, which would not have been available if the original Java bean had been executed outside the EJB environment. When the execution methods of Java bean JB701 are executed, the appropriate results, as designated by the output properties of the original Java bean, are produced.

Steps 616 and 618 comprise a step of executing the original Java bean using the helper object, by getting the original Java bean's input properties from the properties object that was passed to it by the generic EJB.

At step 620, the helper object HO701 creates a second properties object S1 (from the same properties class used to create properties object C1) and, at step 622, populates it with the data gathered from the original Java bean's output properties after its execution has completed. Properties object S1 is simply an object which contains the output properties data produced by the original Java bean during its execution. Properties object S1 is passed back to generic EJB 720 (step 624) when the helper object's execution method completes; the values contained in the properties object S1 represent "return values" of the original Java bean.

At step 626 generic EJB 720 passes the properties object S1 to Access Bean AB701, as a return result of the generic EJB's business method. Upon return of control from generic EJB 720's main business method, Access Bean AB701 saves the returned IO properties object S1 and returns control to the Java application/JSP 700 which had invoked its execution method (step 628).

At step 630, upon return from Access Bean AB701's execution method, the Java application/JSP 700 queries Access Bean AB701's output properties exactly as it would have queried the output properties of Java Bean JB701. Finally, at step 632, when Access Bean AB701 is queried for its output properties, it returns back values stored in the returned (and saved) properties object S1.

Using the present invention, multiple instances of a single EJB can be used to accomplish the tasks of many Java beans, which is more efficient from a resource standpoint than utilizing multiple unique EJB's (e.g., one for each Java bean process), since the EJB container need only manage one EJB type instead of having to manage multiple unique EJB's. In addition, existing Java applications can be driven with minimal changes (they need to create the Access bean instead of the original Java bean), while still taking advantage of the locatability and scalability of the EJB execution environment. By using the properties object of the present invention to package all input and output properties, a more efficient process is available to pass input parameters and extract the results. Using a single EJB for each Java bean results in large numbers of getter and setter methods, each of which have to be individually called, possibly across a network at a high cost. Further, use of the helper object avoids the use of costly introspection during Java bean property setting and getting on the server.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for running one or more original Java beans in an EJB environment based on control from an external program, comprising the steps of:

defining a single generic EJB and installing said single generic EJB in an EJB container;

generating EJB support code for each of said one or more original Java beans; and executing said EJB support code to drive said generic EJB to perform the functions of said one or more original Java beans in said EJB environment.

2. The method as set forth claim 1, wherein said step of generating EJB support code comprises at least the steps of:

introspecting each of said one or more original Java beans to determine their setter/getter and execution methods;

generating, for each of said one or more original Java beans, an access bean having the same signature as said one or more original Java beans;

generating, for each of said one or more original Java beans, a properties class containing input and output properties matching those of each of said one or more original Java beans;

generating, for each of said one or more Java beans, a helper class that subclassess each of said one or more original Java beans; and setting a static variable in each of said properties classes to correlate each of said properties classes with its associated helper class.

3. A method as set forth in claim 2, wherein said external program is modified so that it drives said access bean class instead of said original access bean, and wherein said executing step comprises at least the steps of:

creating an access bean object and a properties object for each of said one or more original Java beans using said modified external program; setting the input properties of each properties object; and invoking the execution method of each access bean object;

creating, using the execution method of each access bean object, an instance of said generic EJB, calling said generic EJB's business method, and passing to it each properties object containing input property values corresponding to the input property values of each of said one or more original Java bean;

creating, using the generic EJB's business method, and Java reflection, a helper object for each of said original Java beans; passing to each said helper object a corresponding properties object, each of said corresponding properties objects having input properties derived from a corresponding access bean; and calling said main execution method of said helper object;

executing each said original Java bean using its corresponding helper object, by getting each original Java bean's input properties from said corresponding properties object that was passed to it by said generic EJB;

creating, for each original Java bean, a second properties object using said corresponding helper object, said second properties object containing the original Java bean's output properties; and passing each said second properties object to said generic EJB;

passing each said second properties object from said generic EJB, to said corresponding access bean object; and saving each said second properties object and returning control to said external program.

4. A computer program product for running one or more original Java beans in an EJB environment based on control from an external program, the computer program product comprising:

a computer-readable program code means embodied in a computer-readable storage medium, said computer-readable program code means comprising:

computer-readable program code means for defining a single generic EJB and installing said single generic EJB in an EJB container;

computer-readable program code means for generating EJB support code for each of said one or more original Java beans; and computer-readable program code means for executing said EJB support code to drive said generic EJB to perform the functions of said one or more original Java beans in said EJB environment.

5. The computer program product as set forth claim 4, wherein said computer-readable program code means for generating EJB support code comprises at least:

computer-readable program code means for introspecting each of said one or more original Java beans to determine their setter/getter and execution methods;

computer-readable program code means for generating, for each of said one or more original Java beans, an access bean having the same signature as said one or more original Java beans;

computer-readable program code means for generating, for each of said one or more original Java beans, a properties class containing input and output properties matching those of each of said one or more original Java beans;

computer-readable program code means for generating, for each of said one or more Java beans, a helper class that subclasses each of said one or more original Java beans; and computer-readable program code means for setting a static variable in each of said properties classes to correlate each of said properties classes with its associated helper class.

6. A computer program product as set forth in claim 5, wherein said external program is modified so that it drives said access bean class instead of said original access bean, and wherein said computer-readable program code means for executing comprises at least:

computer-readable program code means for creating an access bean object and a properties object for each of said one or more original Java beans using said modified external program; setting the input properties of each properties object; and invoking the execution method of each access bean object;

computer-readable program code means for creating, using the execution method of each access bean object, an instance of said generic EJB, calling said generic EJB's business method, and passing to it each properties object containing input property values corresponding to the input property values of each of said one or more original Java bean;

computer-readable program code means for creating, using the generic EJB's business method, and Java reflection, a helper object for each of said original Java beans; passing to each said helper object a corresponding properties object, each of said corresponding properties objects having input properties derived from a corresponding access bean; and calling said main execution method of said helper object;

computer-readable program code means for executing each said original Java bean using its corresponding helper object, by getting each original Java bean's input properties from said corresponding properties object that was passed to it by said generic EJB;

computer-readable program code means for creating, for each original Java bean, a second properties object using said corresponding helper object, said second properties object containing the original Java bean's output properties; and passing each said second properties object to said generic EJB;

computer-readable program code means for passing each said second properties object from said generic EJB, to said corresponding access bean object; and computer-readable program code means for saving each said second properties object and returning control to said external program.

7. A system for running one or more original Java beans in an EJB environment based on control from an external program, comprising:

means for defining a single generic EJB and installing said single generic EJB in an EJB container;

means for generating EJB support code for each of said one or more original Java beans; and means for executing said EJB support code to drive said generic EJB to perform the functions of said one or more original Java beans in said EJB environment.

8. The system as set forth claim 7, wherein said means for generating EJB support code comprises:

means for introspecting each of said one or more original Java beans to determine their setter/getter and execution methods;

means for generating, for each of said one or more original Java beans, an access bean having the same signature as said one or more original Java beans;

means for generating, for each of said one or more original Java beans, a properties class containing input and output properties matching those of each of said one or more original Java beans;

means for generating, for each of said one or more Java beans, a helper class that subclasses each of said one or more original Java beans; and means for setting a static variable in each of said properties classes to correlate each of said properties classes with its associated helper class.

9. A system as set forth in claim 8, wherein said external program is modified so that it drives said access bean class instead of said original access bean, and wherein said executing means comprises:

means for creating an access bean object and a properties object for each of said one or more original Java beans using said modified external program; setting the input properties of each properties object; and invoking the execution method of each access bean object;

means for creating, using the execution method of each access bean object, an instance of said generic EJB, calling said generic EJB's business method, and passing to it each properties object containing input property values corresponding to the input property values of each of said one or more original Java bean;

means for creating, using the generic EJB's business method, and Java reflection, a helper object for each of said original Java beans; passing to each said helper object a corresponding properties object, each of said corresponding properties objects having input properties derived from a corresponding access bean; and calling said main execution method of said helper object;

means for executing each said original Java bean using its corresponding helper object, by getting each original Java bean's input properties from said corresponding properties object that was passed to it by said generic EJB;

means for creating, for each original Java bean, a second properties object using said corresponding helper object, said second properties object containing the original Java bean's output properties; and passing each said second properties object to said generic EJB;

means for passing each said second properties object from said generic EJB, to said corresponding access bean object; and means for saving each said second properties object and returning control to said external program.

* * * * *